(12) United States Patent
Molteni et al.

(10) Patent No.: US 7,576,898 B2
(45) Date of Patent: Aug. 18, 2009

(54) METHOD FOR USING A DEEP IMAGE HOLOGRAM AS A SECURITY DEVICE AND A DEEP IMAGE HOLOGRAM

(75) Inventors: William J. Molteni, Wilmington, DE (US); Michael G. Fickes, Kennett Square, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 72 days.

(21) Appl. No.: 10/928,892

(22) Filed: Aug. 27, 2004

(65) Prior Publication Data

US 2005/0179968 A1 Aug. 18, 2005

Related U.S. Application Data

(60) Provisional application No. 60/545,066, filed on Feb. 17, 2004.

(51) Int. Cl.
*G03H 1/00* (2006.01)

(52) U.S. Cl. .................. 359/2; 430/10; 283/86

(58) Field of Classification Search .......... 359/2, 359/567; 430/10; 283/86; 428/29, 916
See application file for complete search history.

(56) References Cited

U.S. PATENT DOCUMENTS

| | | | |
|---|---|---|---|
| 3,506,327 A | 4/1970 | Leith et al. | |
| 3,532,406 A | 10/1970 | Hartman | |
| 3,838,903 A | 10/1974 | Leith et al. | |
| 3,894,787 A | 7/1975 | Leith et al. | |
| 5,499,116 A * | 3/1996 | Wreede et al. | 359/2 |
| 6,414,761 B1 | 7/2002 | Stepanek | |
| 6,529,297 B1 * | 3/2003 | Kodama | 359/22 |
| 6,646,771 B2 | 11/2003 | Stevenson | |
| 6,765,704 B2 * | 7/2004 | Drinkwater | 359/2 |
| 2003/0155495 A1 | 8/2003 | Drinkwater | |
| 2003/0156305 A1 | 8/2003 | Kitamura | |
| 2003/0174373 A1 | 9/2003 | Drinkwater | |

FOREIGN PATENT DOCUMENTS

| | | |
|---|---|---|
| DE | CA2247974 | 9/1998 |
| GB | 2 317 237 A | 3/1998 |
| WO | WO 00/73991 A1 | 12/2000 |

OTHER PUBLICATIONS

R. Collier et. al., Light Sources for Hologram Reconstruction, Academic Press, 1971, pp. 170-175, XP002333108.

* cited by examiner

*Primary Examiner*—Arnel C Lavarias
(74) *Attorney, Agent, or Firm*—Angela J Grayson; John R Dodd (57) ABSTRACT

A holographic optical element (HOE) that includes a deep image hologram and a method for using this HOE as a security device are described. The deep image hologram is viewable with a collimated or at least partially collimated light source having a center wavelength in the visible region of the electromagnetic spectrum and a spectral bandwidth, wherein the spectral bandwidth of the collimated or at least partially collimated light source at least partially overlaps the spectral bandwidth of the deep image hologram. The deep image hologram is not viewable (i.e., appears essentially unrecognizable to the human eye) with a diffuse lighting source, such as ordinary room lighting.

8 Claims, 10 Drawing Sheets

METHOD FOR USING A DEEP IMAGE HOLOGRAM AS A SECURITY DEVICE AND A DEEP IMAGE HOLOGRAM

FIELD OF THE INVENTION

This invention pertains to a method for using a holographic optical element (HOE) that is comprised of a deep image hologram. The element is especially useful as a security device.

BACKGROUND OF THE INVENTION

Holography is a form of optical information storage. The general principles are described in a number of references, e.g., "Photography by Laser" by E. N. Leith and J. Upatnieks in SCIENTIFIC AMERICAN, 212, No. 6, 24-35 (June, 1965). In brief, the object to be photographed or imaged is illuminated with collimated light, e.g., from a laser, and a light sensitive recording medium, e.g., a photographic plate, is positioned so as to receive light reflected from the object. Each point on the object reflects light to the entire recording medium, and each point on the medium receives light from the entire object. This beam of reflected light is known as the object beam. At the same time, a portion of the collimated light is beamed by a mirror directly to the medium, by passing the object. This beam is known as the reference beam. What is recorded on the recording medium is the interference pattern that results from the interaction of the reference beam and the object beam impinging on the medium. When the processed recording medium is subsequently illuminated and observed appropriately, the light from the illuminating source is diffracted by the hologram to reproduce the wave-front that originally reached the medium from the object, so that the hologram resembles a window through which the virtual image of the object is observed in full three-dimensional form, complete with parallax.

Holograms that are formed by allowing the reference and object beams to enter the recording medium from the same side are known as transmission holograms. Interaction of the object and reference beams in the recording medium forms fringes of material with varying refractive indices which are normal or near normal to the plane of the recording medium. When the hologram is played back by viewing with transmitted light, these fringes diffract the light to produce the viewed virtual image. Such transmission holograms may be produced by methods which are well known in the art, such as those disclosed in U.S. Pat. No. 3,506,327; U.S. Pat. No. 3,838,903 and U.S. Pat. No. 3,894,787, each of which is incorporated herein by reference.

Holograms formed by allowing the reference and object beams to enter the recording medium from opposite sides, so that they are traveling in approximately opposite directions, are known as reflection holograms. Interaction of the object and reference beams in the recording medium forms fringes of material with varying refractive indices which are, approximately, planes parallel to the plane of the recording medium. When the hologram is played back these fringes act as mirrors reflecting incident light back to the viewer. Hence, the hologram is viewed in reflection rather than in transmission. Since the wavelength sensitivity of this type of hologram is very high, white light may be used for reconstruction. Reflection holograms produced by an off-axis process are disclosed in U.S. Pat. No. 3,532,406, which is incorporated herein by reference.

More and more, holograms as described above are being used as an enhanced security means attached to commercial products, such as digital optical disks, compact disks, batteries for electronic products, and any other product that may be susceptible to counterfeiting efforts. The use of a hologram for identification purposes on such products is known. In the majority of prior art references, such a hologram is a surface-relief hologram formed by a stamping process. This process may be incorporated into the manufacturing process of the product. There are disclosures of holograms (volume-phase hologram) being formed and then being applied to a product by way of a label. While using the hologram is advantageous for security devices, there is a significant drawback to this approach in that the hologram can be counterfeited and applied to non-authentic counterfeited products. Therefore, such a holographic stamp or label has limited value as a security device.

There is a significant need for a security device that offers a higher level of security than described above. The present invention provides a solution to this important need.

BRIEF SUMMARY OF THE INVENTION

The present invention relates to a method for viewing a reconstructed image of a deep image hologram contained within a holographic optical element having a surface, said method comprising providing a deep image hologram which is a substantial distance from the surface of the holographic optical element wherein the deep image hologram appears unrecognizable to the human eye under a diffuse lighting source; and illuminating the image with a light source having a center wavelength, spectral bandwidth and illumination angle appropriate for the depth of the image wherein the image is resolved.

The present invention is further directed to a method for establishing the authenticity of an article containing a holographic optical element comprising a deep image hologram having a surface, said method comprising the steps of (a) providing a holographic optical element on an article to be authenticated, said holographic optical element comprising a deep image hologram having a surface, wherein the deep image hologram is located at a substantial distance from the surface of the holographic optical element, whereby the deep image hologram appears unrecognizable to the human eye under diffuse lighting sources; (b) illuminating the image with a collimated or at least partially collimated light source having a center wavelength in the visible region of the electromagnetic spectrum and a spectral bandwidth, wherein the spectral bandwidth of the collimated or at least partially collimated light source at least partially overlaps the spectral bandwidth of the deep image hologram; and (c) establishing the article bearing the holographic optical element to be authentic only if the deep image hologram is observable upon illumination with the approximate collimated light source in step (b) positioned at least one angle $\theta$ with respect to a normal line to the surface of the holographic optical element.

The invention is still further directed to a deep image hologram contained within a holographic optical element having a surface, wherein the image comprises a hologram which is a substantial distance from the surface of the holographic optical element wherein the hologram appears unrecognizable to the human eye under a diffuse lighting source.

DETAILED DESCRIPTION OF THE INVENTION

One embodiment of the present invention utilizes a holographic image manufactured by a volume reflection method used in the holographic industry for producing and reconstructing three-dimensional images from a hologram comprising forming a pattern of interference fringes on a photographic plate wherein the object-bearing beam and reference beam impinge on opposite sides of a photographic plate and reconstructing the image by illuminating the hologram with at least a partially collimated light source to view the reconstructed image. A partially collimated light source is a light source wherein at least some of the light is produced in a parallel beam of radiation. The reconstructed image may be used as a security device for authenticity verification. The light source may be the light of a laser or other monochromatic collimated source. The back-beam hologram behaves as a selective reflecting filter, reconstructing the image in a narrow band of wavelengths that appear as a single color. The particular spectral band that is visible in the reconstruction depends markedly on the geometry of construction. The reconstruction color tends to shift to a shorter wavelength because of distortion or shrinkage of the emulsion that changes the spacing of the interference fringe pattern. However, it is possible to control the amount of spectral shift by adjustment of the processing variables during development. Also, it is possible that multiple images and images using radiation of more than one wavelength can be stored in the hologram. It is possible to reconstruct multicolor images from back-beam holograms viewed by reflection in white light, each color being selectively reflected from the hologram and combined in the image to yield a colored image that appears truly three-dimensional.

Figure 1:
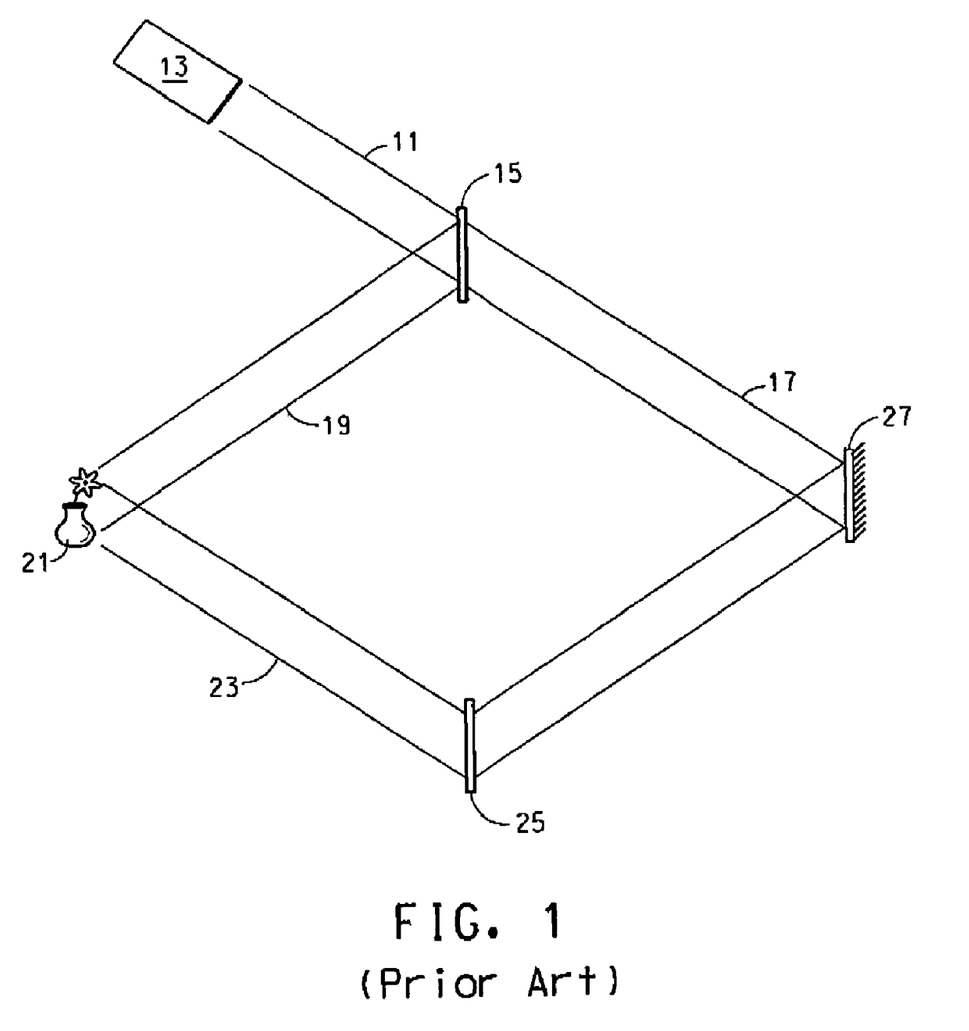
FIG. 1 is an illustration of an embodiment of the production of a back-beam hologram.

Further, referring to FIG. 1, the beam 11 from a source of collimated and coherent light 13 is divided by suitable means, such as a beam splitter 15, into a reference beam 17 and an incident beam 19. The incident beam illuminates an object 21. The reflected light or object-bearing beam from the object passes to photographic plate 25. The reference beam is directed onto the photographic plate by suitable means such as a mirror 27, but strikes the plate on the side opposite that is illuminated by the object-bearing beam 23. An interference pattern is produced and recorded in the photographic plate 25. Preferably the path lengths of the reference beam and object-bearing beams (and 23) beginning at the beam splitter 15 are about equal, although if the light is reasonably coherent this is unnecessary. Coherent sources of light produce electromagnetic radiation in which two or more sets of waves have a constant phase relationship. Usually, coherent sources of light are coherent only over a certain distance.

The arrangement for bringing the two beams (object-bearing and reference beams) onto opposite sides of the recording device may of course be varied considerably. Two separate sources of light may be even used as long as they are "locked in phase" (i.e., they are coherent with each other); and, of course, the optical devices used for directing the various beams may be selected for convenience.

Figure 2A:
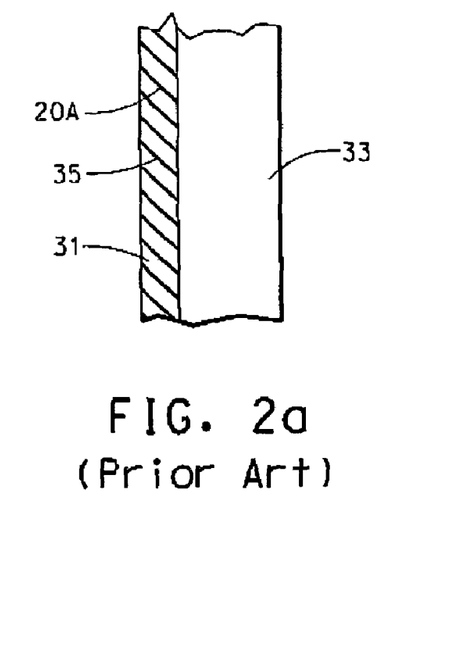
FIGS. 2A & 2B are illustrations of an enlarged cross section of a photographic plate illustrating an example of the arrangement of fringes in the emulsion of a front beam hologram and back beam hologram.
Figure 2B:
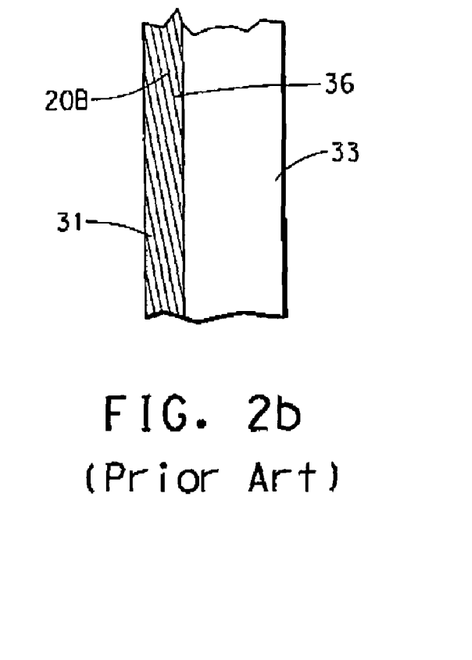

FIGS. 2a and 2b are a comparison of example fringe patterns (20A, 20B) produced in the emulsions of two photographic plates. FIG. 2a is an example of a front-beam hologram and FIG. 2b is an example of a back-beam hologram. These holograms were produced and then sectioned to determine the difference in the fringe patterns of the two methods. It is known that the interference pattern is produced by maxima and minima of the wave forms in the two light beams as they cross. In FIG. 2a the emulsion 31 is positioned on a transparent base 33 (such as glass). After exposure with the front beam technique, the developed plate was sectioned and examined under a microscope. The dark silver grains or fringes 35 in the emulsion 31 indicate points of interference maxima between the object bearing beam and reference beam, i.e., the antinodes of the standing waves. These fringes 35 are slanted about 30 to 40 degrees from a normal line to the surface of the photographic plate and depend largely on the angle between the two beams and the angle at which they strike the plane of the photographic plate. The angle is substantially parallel to a line that bisects the angle between the object-bearing beam and reference beam. The maximum angle permitted by the front-beam technique is limited by the refractive index of the emulsion 31 and consequently by the critical angle for total internal reflection, which for silver halide emulsions is about 40 degrees. In FIG. 2B, wherein a photographic plate was used to record a back-beam hologram, the fringes 36 are within a few degrees of being parallel to an outer surface of the photographic plate and being substantially parallel to a line that bisects the angle formed between the object-bearing beam and reference beam 17. These two holograms of FIGS. 2a and 2b may both be called specialized diffraction gratings, but it is obvious that their diffraction characteristics will be quite different. Thus, the back-beam hologram can be reconstructed in reflected incoherent light, a property not shared by the front-beam hologram.

Figure 3:
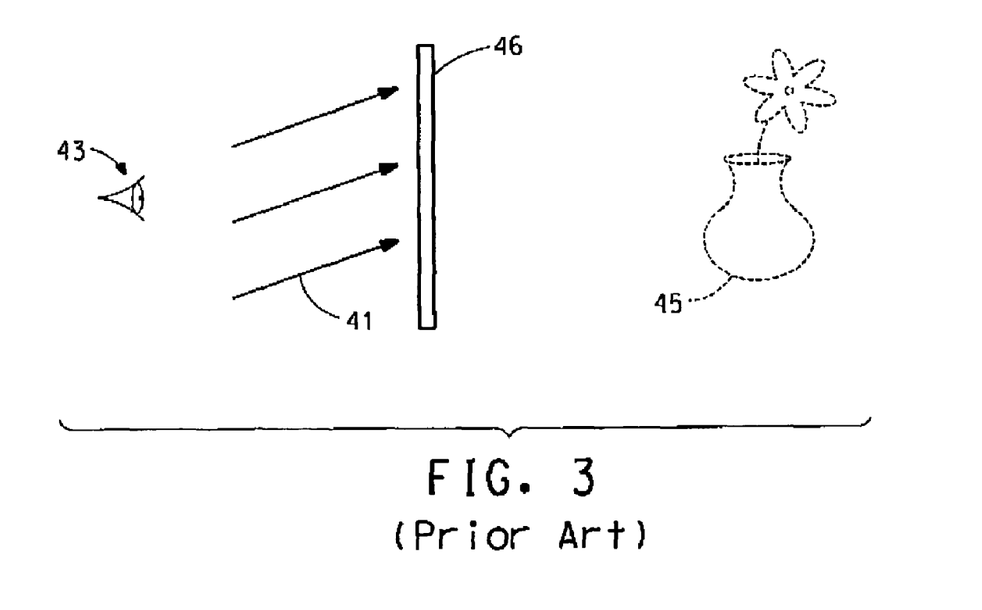
FIG. 3 is an illustration of the reconstruction of an image from a back-beam hologram.

FIG. 3 shows the reconstruction of an image from a back-beam hologram 46. The hologram 46 is illuminated by reflection of incoherent light 41 (daylight or an incandescent light) and the viewer 43, although viewing a reflected image still sees the three-dimensional image 45 of the object through the "hologram window", i.e., as if it were behind the hologram 46. If the emulsion did not shrink during processing of the plate, this image has the color of the light that was used to form the hologram. This method is further explained in U.S. Pat. No. 3,532,406, which is incorporated herein by reference.

Figure 4:
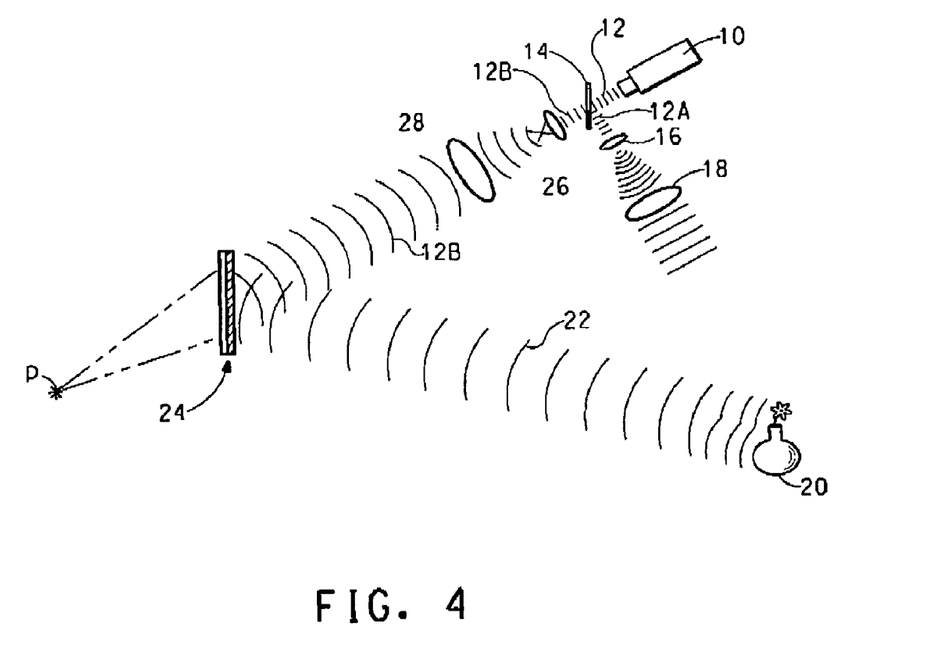
FIG. 4 is an illustration of an arrangement for construction of a front beam transmission or surface relief hologram.

Another embodiment is a conventional surface relief method used by the holographic industry. A general embodiment is referenced here in below. FIG. 4 illustrates an arrangement wherein a conventional surface relief hologram is made. Coherent and collimated light 12 from laser 10 is divided into two components 12A and 12B by beam-splitter 14. Component 12A is directed through a telescopic arrangement containing lenses 16 and 18 to increase the cross section of light beam 12a. It illuminates subject 20. Subject 20 reflects and scatters light from illuminating beam 12A. Wave front 22 is a portion of the light reflected and scattered by subject 20. The form of wave front 22 is functionally related to subject 20. It is incident on a light-sensitive material 24 such as photographic plate. Wave front 22 contains optical information about subject 20. All the information needed to see a three-dimensional stereoscopic view of subject 20 is present therein.

Component 12B of coherent and collimated light 12 passes through a telescope comprising lenses 26 and 28 increasing its cross section and imparting a preselected shape to its waveform. Light beam 12B having a preselected waveform is used as a reference. The waveform of beam 12B should be reproducible. To this end it is made to converge on point P. Reference light beam 12B is also incident on light-sensitive surface 24. Interference between light in reference beam 12B and wave fronts 22 forms a complex diffraction pattern uniquely related to subject 20 on photosensitive surface 24. The pattern is a holographic image of subject 20. Holographic images or diffraction patterns are usually too complex to be viewed by normal direct observation in the way conventional photographs are viewed. A special illuminating technique is required to view an image of the subject.

Figure 5:
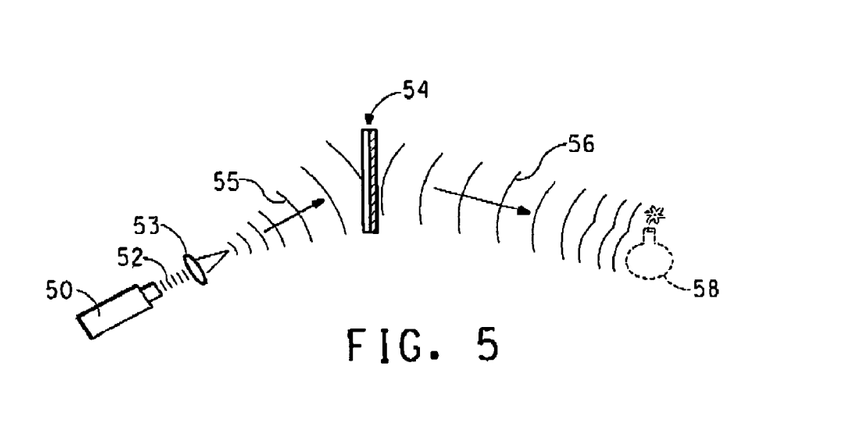
FIG. 5 is an illustration of an arrangement useful in reconstructing a real orthoscopic image of a subject from a transmission hologram.

FIG. 5 shows one method suited for illuminating the previously made holographic image 54 and forming a real orthoscopic image 58. Laser 50 emits coherent light 52. Lens 53 directs light 52 through focal point P forming a point source there at point P and gives it a pre-selected waveform 55. Direction and waveform 55 of illuminating light beam 52 are selected so it represents a time reverse of the reference beam 12B used to make the hologram according to FIG. 4. Time reverse beam is a light beam having a direction and waveform, relating to a holographic image, so it appears to emanate from the point to which the original reference beam having the same waveform converged toward. Specifically, if reference beam 12B converged toward "p", beyond photosensitive surface 24, the time reverse of reference beam 12B is a light beam appearing, relative to holographic image 54, to emanate P having the same waveform as reference beam 12B. Hologram 54 is made by the method illustrated in FIG. 4. When time reverse illuminating light 55 is incident thereon, the holographic image pattern of hologram 54 diffracts a portion of light 55 into wave fronts 56. In the diffraction process wave fronts 56 are shaped by the holographic image to the same form that wave fronts 22 had. Wave fronts 56 travel in the opposite direction though. A real image 58 is formed by wave fronts 56. The real image 58 is pseudoscopic, i.e., appearing with the relief reversed. It can be recorded by placing a photographic material in the space occupied by the image. All the optical information originally transmitted by subject 20 in wave fronts 22 and incident on photosensitive surface 24 is present in image 58.

Embodiments of the present invention describe image elements of a hologram placed at positions that would normally be avoided because the positions are considered by those skilled in the art to produce a defective, blurred, and unusable image. These image elements create a deep image hologram. Typically, when conventional commercial graphic arts or security holographic labels are made, great effort is put into placing all the elements of the image very close to the surface of the holographic recording material. This ensures the maximum clarity under non-ideal lighting conditions. Usually any part of an image that is a substantial distance from the film's surface, which is typically greater than ⅛ inch including all values found therein, will be illegible, depending on detail, in diffuse lighting conditions. Diffuse lighting is incident light that is redirected or scattered over a range of angles from the surface on which it is incident. An ideal viewing condition that commercial holographic reconstruction images are designed for is diffuse lighting such as fluorescent or incandescent lighting.

Figure 13:
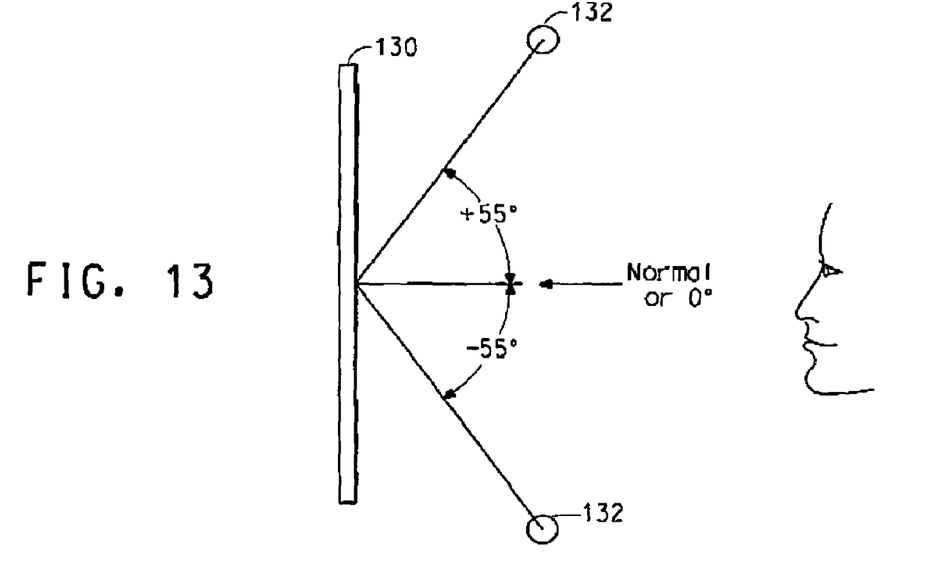
FIG. 13 is a diagram illustrating illumination angles.

The present invention utilizes the conventional methods described above with the exception of positioning the image element(s). Image elements are positioned at a substantial distance typically greater than ⅛ inch and all values found therein away from the film's surface. The positioning choice effectively obscures or hides the image by taking advantage of the nature of volume reflection holograms to blur deep images in diffuse lighting conditions. The blurred deep images are considered "flaws" by those skilled in the art of holography. Image reconstruction of the deep image hologram uses an illuminating light source that resembles the light source that the hologram was made with. The light source (132) is positioned at an angle θ with respect to the normal line to the surface of the holographic optical element (130) in the range from about +55 degrees to about −55 degrees including all degrees and partial degrees contained therein. (See FIG. 13.)

Suitable light sources for viewing deep image holograms of this invention are those that provide collimated or at least partially collimated light in the visible region of the electromagnetic spectrum. Representative examples of suitable light sources include, but are not limited to, lasers, including laser pointers, and various LED pocket lights that provide collimated or near collimated light output. In one embodiment, a collimated source may be used; such example includes a laser. In another embodiment, quasi-monochrome color or near collimated point sources of light may be used, such as, a LED pocket light, or a diffused or expanded laser pointer. These sources are relatively inexpensive and fairly common. Their use makes the reconstructed image appear recognizable to an observer. Both horizontal and vertical movement of the laser pointer will result in a corresponding movement of the hidden images.

The "flaws" in diffuse light exhibit source size defocusing and chromatic blur. The hologram replays with the greatest fidelity to the original model when the exact same wave front and wavelength are used to reconstruct the image as were used make it. Typically, a spherical wave coming from a point yields greatest fidelity.

If the light source is enlarged or extended in one direction or another, the hologram, in effect, sees that source as an array of many points at slightly different angles. Each of these points is diffracted, guided out of the hologram at a correspondingly different angle and forms an image for each of these source points. These images generally overlap separated by the distance from the surface and the sine of the diffraction angle. From such a light source, a smear is created rather than one distinct image. The closer the image is to the hologram the smaller the distance to its adjacent image. If the image were to focus exactly on the surface there would be no separation of the images caused by the angle between the ends of the extended source and the image would appear sharp. Chromatic blur causes a similar effect when white or broadband light is used to illuminate a holographic label. White light is made up of different colors. Each of the colors diffract at a slightly different angle when emerging from the hologram. For each color a separate image is formed. Also, the further the image is from the surface of the film, the greater the separation between focused images. Each image is also of a slightly different color. They overlap and appear as a blur or smear of color. A volume hologram has some color filtering characteristics, but it is far from mimicking a laser. These two phenomena combine to further increase the blur.

In one embodiment (see FIG. 6), a physical model of all the elements that are to be the final holographic label is made (603, 604). The elements, etched eagle coin-like model (603) and etched DuPont® oval (604), are positioned in desired locations relative to the surface of the final hologram. For cosmetic reasons it is attempted to make the standoffs (601, 605) and base plate (602) invisible by minimizing the amount of laser light that hits them and either painting them black and/or making them out of glass. The base plate is typically glass. In addition, to aesthetically balance the holographic label, an element (607) with non-descript writing (608) placed thereon on standoff (609) was added to the model.

Figure 7:
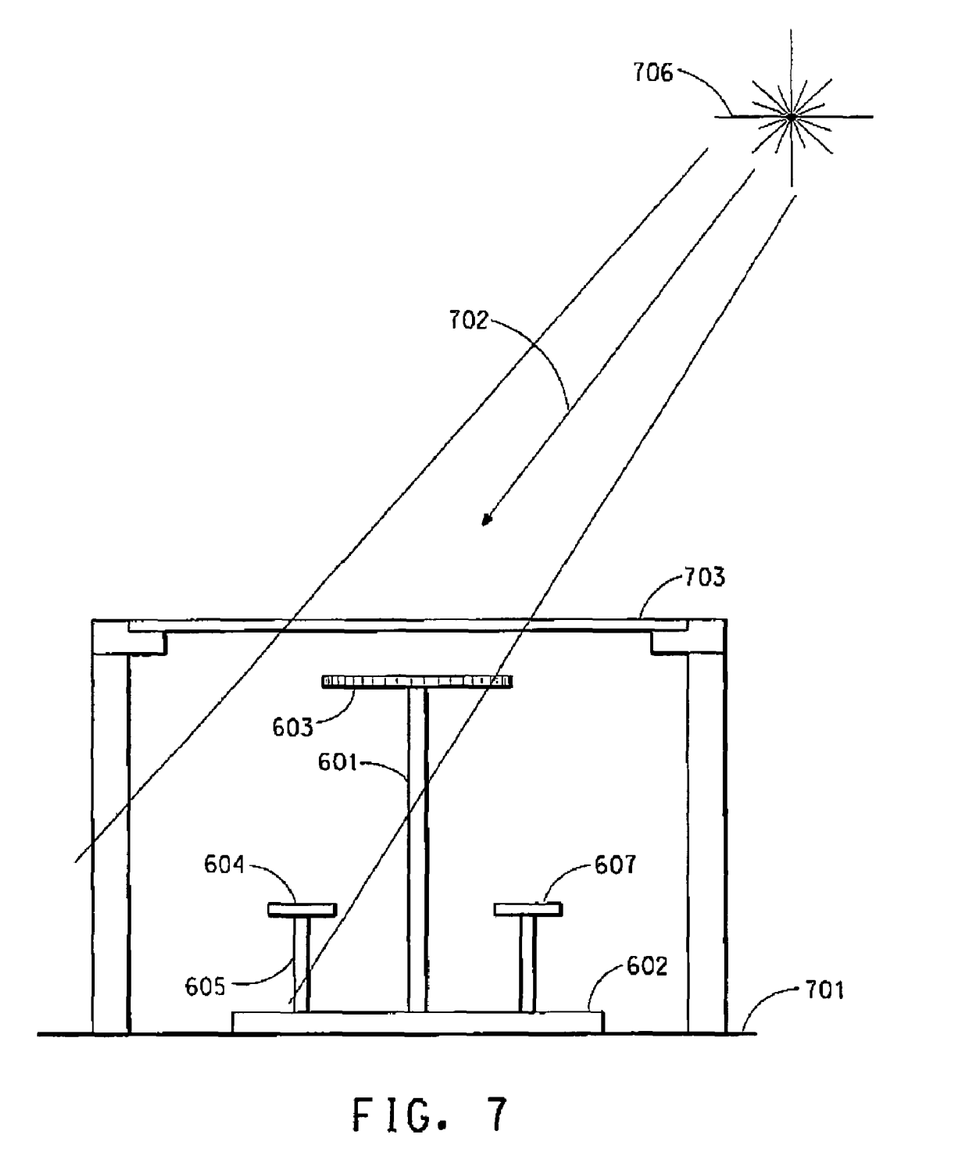
FIGS. 7 & 8 are illustrations of imaging steps.

FIG. 7 illustrates the model fastened to a vibration isolated optical table (701) and lighted with a light source (706) creating an expanded laser beam (702) from about 45 degrees to the normal to the engraved model (603, 604). This is the H1 exposure step. In an at least two color version, selected model elements would be covered or removed during exposure. This would prevent the selected elements from receiving laser light during the H1 exposure. This step could be repeated if additional colors are desired.

The expanded laser beam is then turned off and a 5×5-inch glass plate coated with nearly transparent dichromated gelatin is placed about ¼ inch above and centered over the model. Dichromated gelatin (DCG) (703) is an example of a common holographic recording material. The laser is turned on for several seconds. Approximately 90% of the laser light passes through the coated plate, hits the object model, and reflects back up to the coated plate. The incoming light and the reflected object light meet to form an interference pattern that is recorded within the DCG coating. After chemical processing, changes in index of refraction corresponding to the interference pattern are produced within the coating. These are called fringes. The spaces between these fringes are very small, less than the wavelength of the laser light they where made with. At this point, the coated plate still appears quite transparent. When these fringes see light (702) of any color, the diffraction effects of the microscopic features filters the color and redirects the light to form a blurred image of the original object. However, when re-illuminated with the same laser that exposed it and placed back in the same recording position, the image appears very clearly at all distances from the plate. At this point in the process a detailed image would be almost completely unrecognizable in diffuse light because all image elements are greater than a ¼ inch from the hologram's surface.

In the embodiment that has at least two colors, first exposed element would be covered and the first covered element would be uncovered. A second hologram is made of the element or elements that where covered or removed during the first exposure using the same process as for the first exposure. This step would be repeated for each additional color until the number of desired colors is achieved.

Figure 8:
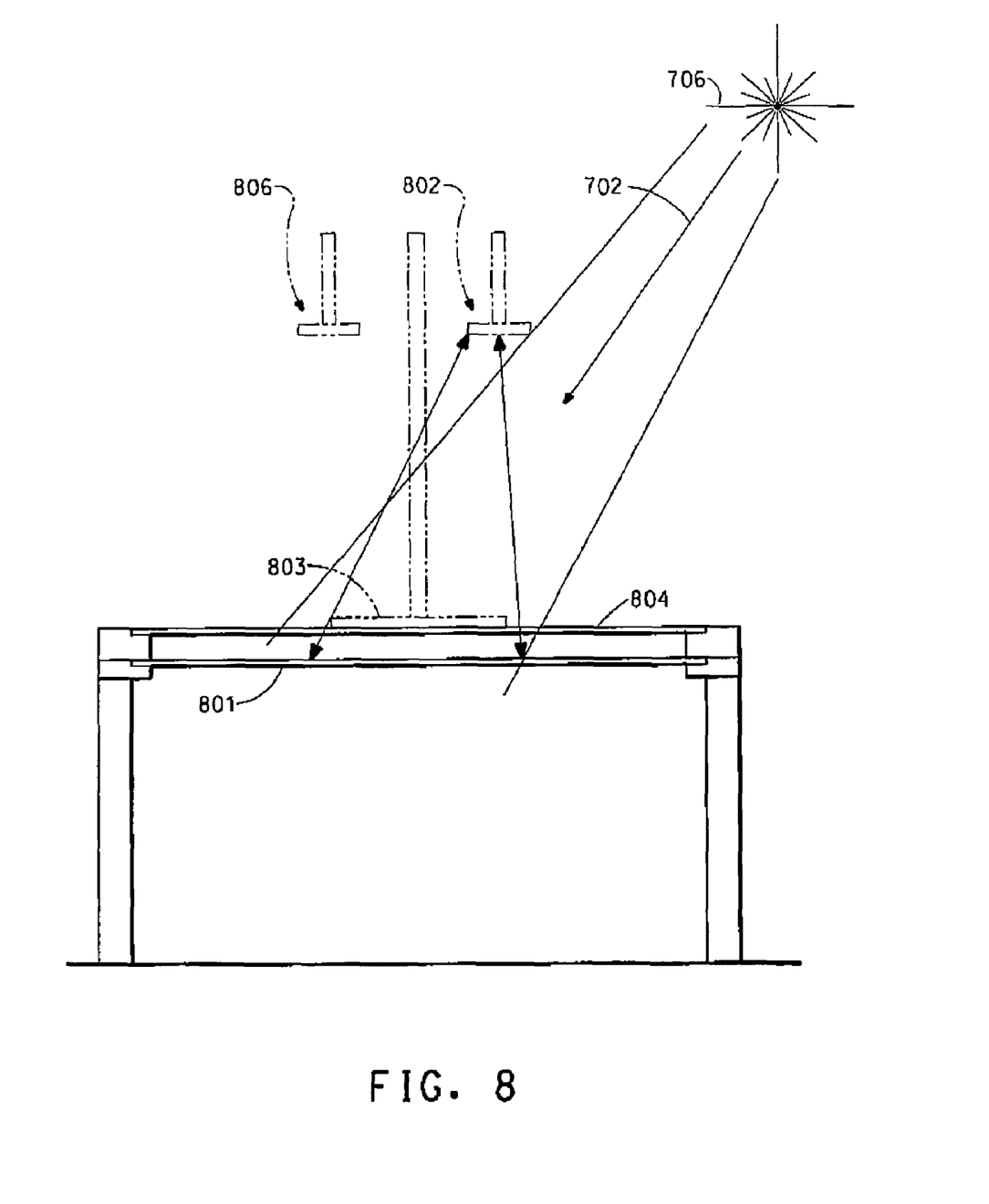

In the next step (see FIG. 8), the first exposed and processed DCG hologram (801) (often called H1) is inverted and placed back in its holder. The model is removed. With a laser light on we see an orthoscopic three-dimensional image (802, 803, 806) that floats above the DCG plate. This image is often called the virtual image. The laser is turned off and a second DCG unexposed recording plate is mounted approximately ¼ inch above the first hologram (H1) (804). The virtual image of the engraved eagle element is now right on the surface of the second recording plate (804). Next the laser is again turned on for a few seconds, the plate is exposed and processed. This is a master hologram (H2) that could go into a replication machine and be copied.

In the embodiment that has at least two colors, the first H2 is processed in a way to make it only viewable to one chosen wavelength of laser light (for example 488 nm). The second H2 would be processed in a way to make it only viewable in a different color of laser light (for example 514 nm). The two H2s would be sandwiched together and registered so the two elements were in their correct positions. The sandwich would be placed into a replicator and a photopolymer film would be laminated to the surface. In this case at least two laser wavelengths would be used to expose and make the copies. The two wavelengths, for example, may be 488 and 514 nm. The colors would make each element appear and record in its appropriate predesigned color. The photopolymer would then go through standard processing. The finished hologram can be tuned or shifted by process changes to make the deep hidden element appear recognizable only when illuminated with the appropriate LED, etc.

When the photopolymer hologram is processed and inverted again, it will have a sharp eagle image on the surface in diffuse room light. However, the background image will be blurred and unrecognizable until an at least partially collimated light source which at least partially overlaps the spectral bandwidth of the deep image hologram near point source characteristics is used to illuminate the image, for example, a LED or laser pointer. Now not only will the engraved eagle be sharp, but also the background deep image of the DuPont® oval will be recognizable and not excessively blurred.

The background information is hidden by the natural blurring characteristics of a hologram in diffuse room light, which is a non-point and white (broadband). The desired background deep image only appears distinctly when a light source comprising a center wavelength, spectral bandwidth, and an angle that is appropriate for the depth and detail of the image wherein the deep image may be resolved.

EXAMPLES

It is noted that all spectral measurements found herein are radiometric, i.e., wherein the flow of electromagnetic energy is measured in quantitative terms.

Example 1

To determine the depth of a deep image hologram wherein the holograms are recognizable under different light sources, a 42 piece ⅜ inch wide by ½ inch high model was constructed. Etched DuPont® logos, with text sizes in the range of 0.03 to 0.032 inches wide by 0.07 to 0.089 inches high where mounted by gluing to a stepped staircase-like armature or standoff. The steps were in 1/16 inch depth increments.

The model was illuminated and exposed in the same manner as described above. First, an H1 DCG was made. The H1 hologram was next time reversed illuminated to reconstruct a real image of the logo staircase. A second hologram H2 was made in a similar manor to the original eagle hologram as described above. The image plane was focused on the 8th logo down on the staircase which was about ½ inch down. A DCG finished master hologram was produced with an image projecting ½″ in front of the surface, and the 8 images to the surface image and 34 images down into the depth of the hologram. The process was completed as described for the eagle hologram above. The data was compiled in Table 1.

TABLE 1

| DH-0010 Depth and Visability Sample | FWQM (nm) | Peak (nm) | From to (nm) | | Description of source | Visability at Depth + g= above the surface Neg = below |
|---|---|---|---|---|---|---|
| Blue LED | 42 | 470 | 450-492 | Blue LED | point @ 12" | not recognizable & Dim @ any angle @ depth |
| Green LED | 58 | 518 | 492-550 | Green LED | point @ 12" | "−10/16 to +1/2+" |
| Red LED | 36 | 638 | 620-656 | Red LED | point @ 12" | −6/16" to +6/16 |
| Orange LED | 28 | 594 | 580-608 | Orange LED | point @ 12" | −12/16" to +7/16" |
| Green#2 | 56 | 506 | 480-536 | Green#2 | point @ 12" | −7/16" to +6/16" |
| Green Laser | 4 | 532 | 530-534 | Green Laser | Lens expanded Pointer | −5/16" to +1/4" |
| Red Laser | 8 | 652 | 648-656 | Red Laser | Lens expanded Pointer | not recognizable & Dim @ any angle @ depth |
| Green Filter | 14 | 532 | 522-536 | Green Filter | KI-120 Koehler Uniform Illuminator | −7/16" to +5/16" |
| Fluorescent | N/A | N/A | | Room Light | 2 × 4' bank @ ~10' | −1/16" to +1/16" |
| Sun Light | | | | Clear day | 2:00 PM | −9/16" to +1/2" |
| Blue Laser | | 488 | | | Lens expanded Ion | not recognizable & Dim @ any angle @ depth |
| Green Laser | | 532 | | | Lens expanded solid state | |
| white | N/A | N/A | | | KI-120 Koehler Uniform Illuminator | −9/16" to +1/2" |

Example 2

Figure 6:
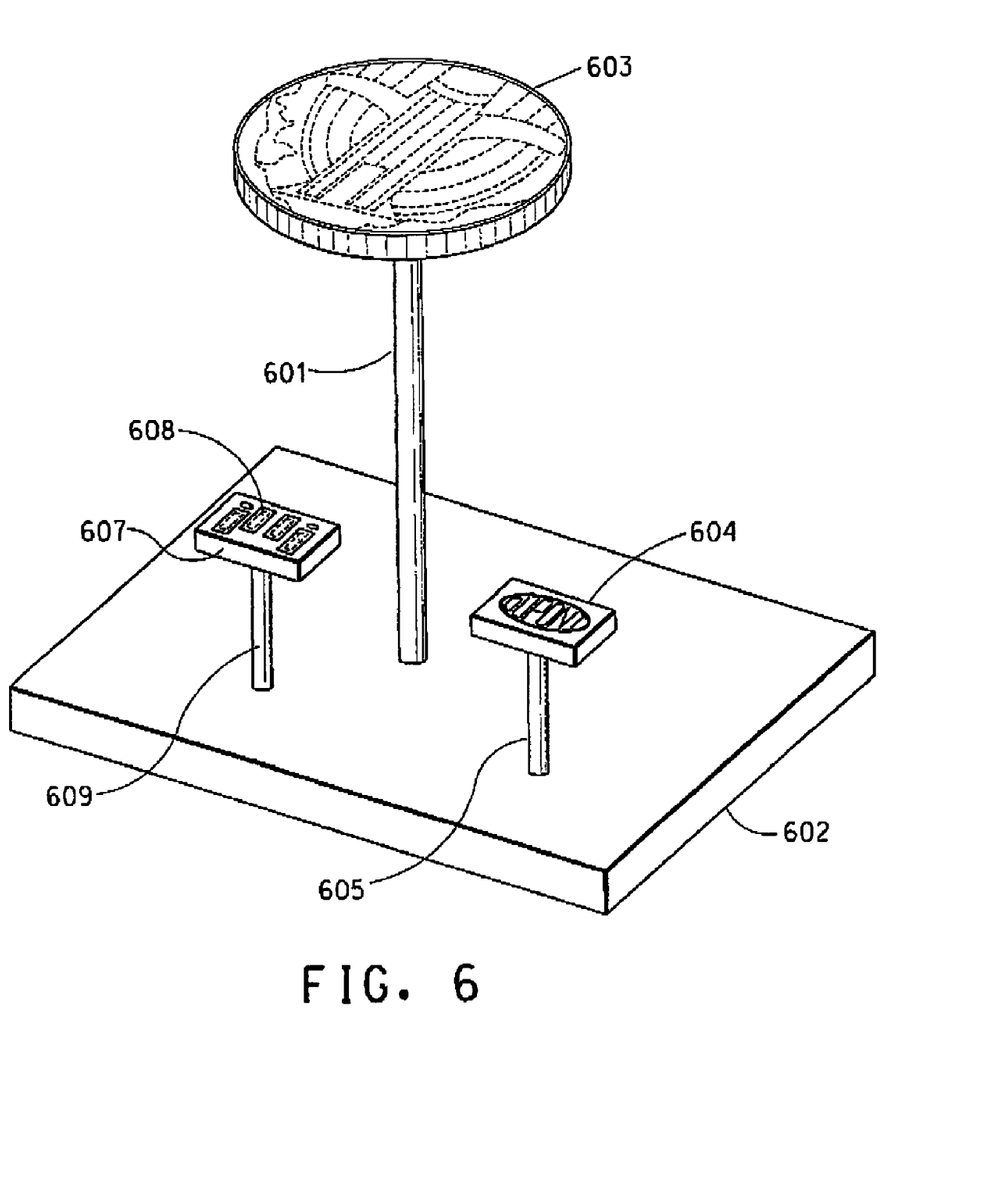
FIG. 6 is an illustration of a physical model.

A physical model of all elements to be included in a final holographic label was constructed. Elements were positioned relative to the surface of the final hologram. FIG. 6 illustrates a constructed physical model. A ~3/4 inch diameter ~1/32 inch thick model (603) was designed to resemble the eagle emblem on a US dollar bill. It was constructed of sculpted polymer clay, painted in gray scale, and attached to a ~1/16 inch metal ring mount for support, vibration and thermal stability. An ~1/2 inch by 3/16 inch by ~1/32 inch photo-acid etched in magnesium DuPont® oval logo (60) was painted, polished, and attached on the same ring between the wing tips of the eagle model. This construction was then attached to a black 21/8 inch by 1/8 inch screw. The assembly was then attached to near center of a 4 inch by 5 inch by 1/8 inch clear glass plate. A second smaller 3/8 inch by 1/4 inch by 1/16 inch photo-acid etched into magnesium, painted, and polished DuPont® logo model was attached to a 5/8 by 1/8 inch black screw. This smaller assembly was also attached to the same glass plate as the eagle assembly, but moved ~1/2 inch to the right and ~1/2 inch down from the center of the base of the screw holding the eagle. This made the distance from the surface of the eagle to the small logo about 11/2 inches. Another magnesium block (607) approximately the same rectangular dimensions, with gibberish (608) painted on its top surface, was placed approximately opposite to the small DuPont® logo on the glass plate. This latter placement was done to visually balance the image.

Illumination and Exposure of the H1

The assembly was then attached to a vibration isolated optical table with a stable metal mount. Over the model assembly another stable mount was also attached to the table. The mount held the dichromated gelatin (DCG) coated glass plate (H1) for the first exposure. Dichromated gelatin (DCG) is a common holographic recording material that is described in numerous references. See, for example, "Control of DCG And non silver holographic materials" by Rallison.

Before the DCG plate was put into position, a spatially filtered slowly diverging beam of laser light was angled from above at 45 degrees from normal to the model. The beam was used to illuminate the model elements and to illuminate the DCG recording material when it was put into place. For cosmetic reasons the standoff screws and base plate were made essentially invisible by minimizing the amount of laser light that hit them. It allowed most of the laser light that was not intended to illuminate the model to pass through to a black absorber below the mounting plate. The laser used was a coherent Sabre argon ion laser (Coherent Inc., Santa Clara, Calif.) set at 2 watts and 488 nm. DCG generally requires approximately 50-70 mJ for an adequate exposure. Using a Coherent, Inc. Field Master power meter, the power was set on the future DCG surface to ~2500 uw/cm which gave us a typical exposure time of 20 sec.

Next the expanded laser beam was turned off. During setup of the model used in this example, the DCG plate was humidified in a room with a RH of ~54% for 2 hours. Exposure and humidification times can vary from batch to batch of DCG. So, trail and error was required to find the correct exposure and processing conditions. The trial and error is well within the expertise of those skilled in the art. A 5×5-inch glass plate coated with nearly transparent DCG was mounted 1/4 inch above the surface of the eagle model and centered it over the model. Prior to exposure, a 5 minute settling time was provided to allow heat and vibrations to dissipate from the model, optics, optical table, and the room. Next a shutter was opened in front of the laser for 20 seconds to initiate exposure. Approximately 90% of the laser light passed through the coated plate reflected off the model and returned to the opposite side of the DCG plate. The incoming light and the reflected object light met from opposite sides to form an interference pattern that was recorded within the DCG coating as fringes. See FIG. 7.

Chemical Processing

After exposure the DCG plate was placed in a Kodak fixer bath for 45-60 seconds. It was then placed immediately into 80-120 degree F. water for ~4 seconds and in another water bath at 80 to 120 degrees F. for 4 seconds. Next, it went into a 80% isopropyl alcohol 20% water bath at 130-140 degrees F. for 4 seconds. It then went into 2 sequential 100% alcohol baths at 130-140 F. for 2 seconds each. Then the exposed DCG plate was dipped into a final 100% alcohol bath for several seconds, which was sufficiently long enough to allow the plate to be slowly removed from the bath to promote even drainage and drying.

The plate was viewable but the film was swollen and the reconstruction of the image was too green for the next exposure step. The following dehydration process accomplished color tuning to the original exposure wavelength of 488 nn. The plate was placed back in the 80% alcohol 20% water bath for 4 seconds then rinsed in a 100% alcohol bath and slowly removed. At this point in the process the image in the H1 was almost completely unrecognizable in diffuse light because all image elements are greater than a 1/4 inch from the hologram's surface.

Exposing the H2

Prior to this next exposure step, the exposed and processed H1 plate was inverted, and placed back in its holder, and the model was removed. The shutter for the laser @ 488 nm was opened and illuminated the H1 at 45 degrees, but from the opposite side, (time reverse illumination) an observable image of the original model floated above the DCG plate. The laser was turned off and a second DCG unexposed recording plate was mounted approximately ¼ inch above the first hologram H1. The observable image of the eagle model element was focused on the surface of the second recording plate the H2. The laser was again turned on for approximately the same exposure time, wavelength, and power level as were used for H1 above. The plate was chemically processed and tuned in the same manner as the H1 except that the target wavelength for tuning was 476 nm. Slight variation in bath times accomplished tuning to the new wavelength. This was now a master hologram. After a thin sheet of glass was laminated to the film side with UV curing adhesive for protection, this master hologram was ready for use in replication.

Replication of the H2

The above master hologram (H2) was placed into a holder on a holographic replicator (DuPont® Holographics, Logan, Utah). HRF 734 photopolymer copy film (E.I. du Pont de Nemours & Co., Inc., Wilmington, Del.) was pressed/laminated onto its surface. A collimated and coherent laser beam at 45 degrees and at 476 nm wavelength with an approximate intensity of 1.25 mw was turned onto this film master lamination for 40 seconds. The copy film was then lifted from H2 and moved by web into a UV 2.6 plus watts at 368 nm flood station for 40 seconds. The exposed and UV fixed film was laminated to a color tuning film CTF 146 (E.I. du Pont de Nemours & Co., Inc., Wilmington, Del.) and moved through a baking oven at 3 meters per minute at 101 degrees C. This produced a finished hologram with a peak wavelength of ~530 to 550 nm. It was then passed through a 150 degree C. scroll oven at 0.3 meters per minute. After the film was removed from the oven it was laminated on its backside with a double-sided black adhesive. A single-sided clear protective topcoat was applied to the front side.

Figure 9:
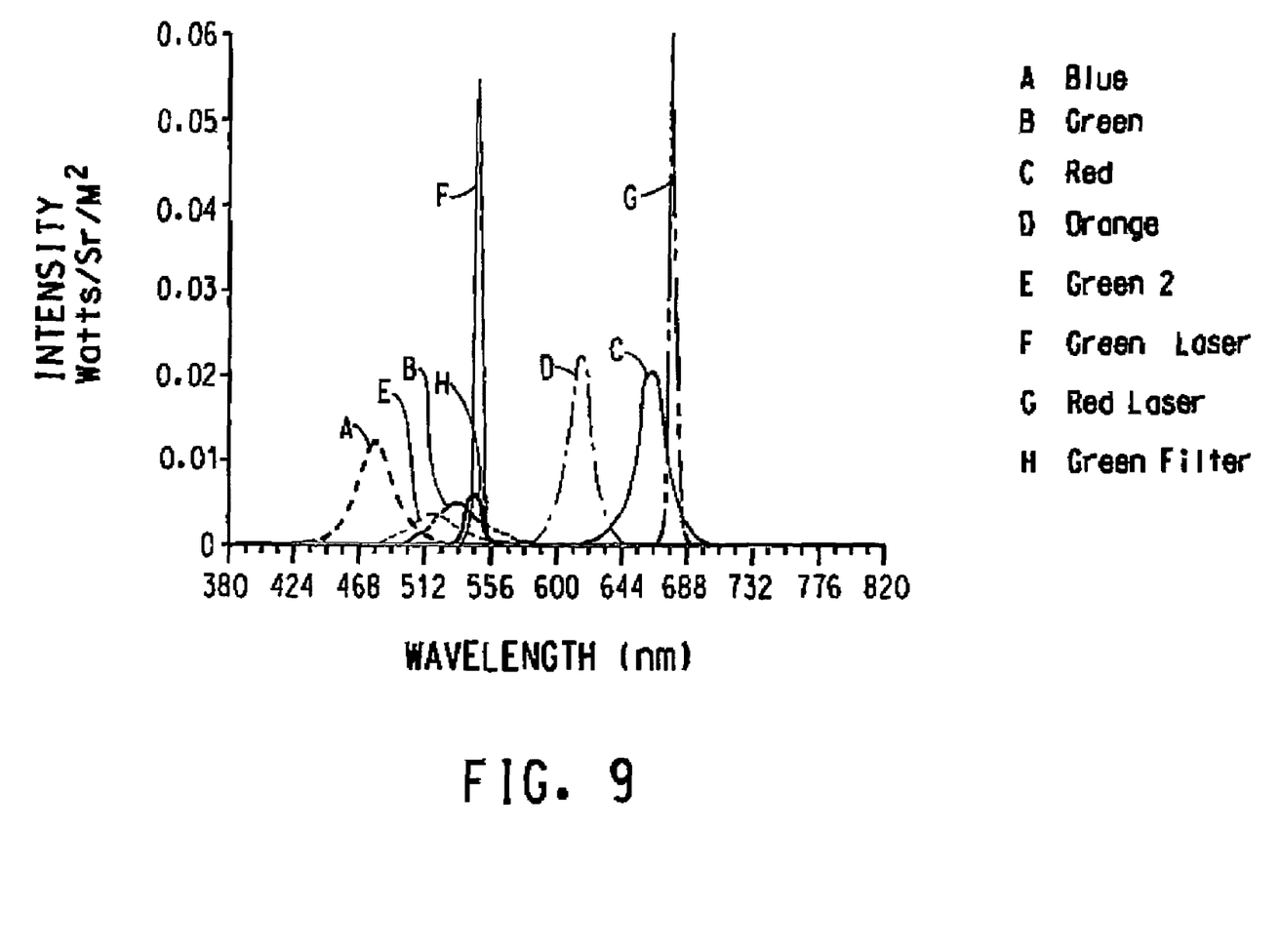
FIG. 9 is an illustration of light source spectra.

At this point the hologram was complete. The eagle image element was now easily seen in diffuse lighting conditions, but the deep hidden DuPont® logo was blurred and could only be recognized with mono chromatic collimated or point source light. The types of useful sources are lasers, LEDs, and narrow band filtered white light. The appropriate sources for this example were an LED that peaked at 518 nm and had a full width quarter max (FWQM) of 40 nm. And a green laser pointer that peaked at 532 nm with a FWQM of 8 nm and a narrow band filtered white light that peaked at 532 nm and a FWQM of 14 nm. Sources outside of these ranges produce unrecognizable hidden images. See Table 2 and the graph of FIG. 9 showing the spectral curves of the illumination sources. FWQM is defined as the full spectral from 25% of intensity on one side of the peak to 25% intensity to the other side of the peak. In addition, illumination angles are given in FIG. 13 wherein the light source is positioned at least one angle θ with respect to a normal line to the surface of the holographic optical element.

TABLE 2

| Sample | FWQM (nm) | Peak wavelength (nm) | Wavelength range (nm) |
|---|---|---|---|
| Blue | 42 | 470 | 450-492 |
| Green | 58 | 518 | 492-550 |
| Red | 36 | 638 | 620-656 |
| Orange | 28 | 594 | 580-608 |
| Green#2 | 56 | 506 | 480-536 |

TABLE 2-continued

| Sample | FWQM (nm) | Peak wavelength (nm) | Wavelength range (nm) |
|---|---|---|---|
| Green Laser | 4 | 532 | 530-534 |
| Red Laser | 8 | 652 | 648-656 |
| Green Filter | 14 | 532 | 522-536 |

Figure 10:
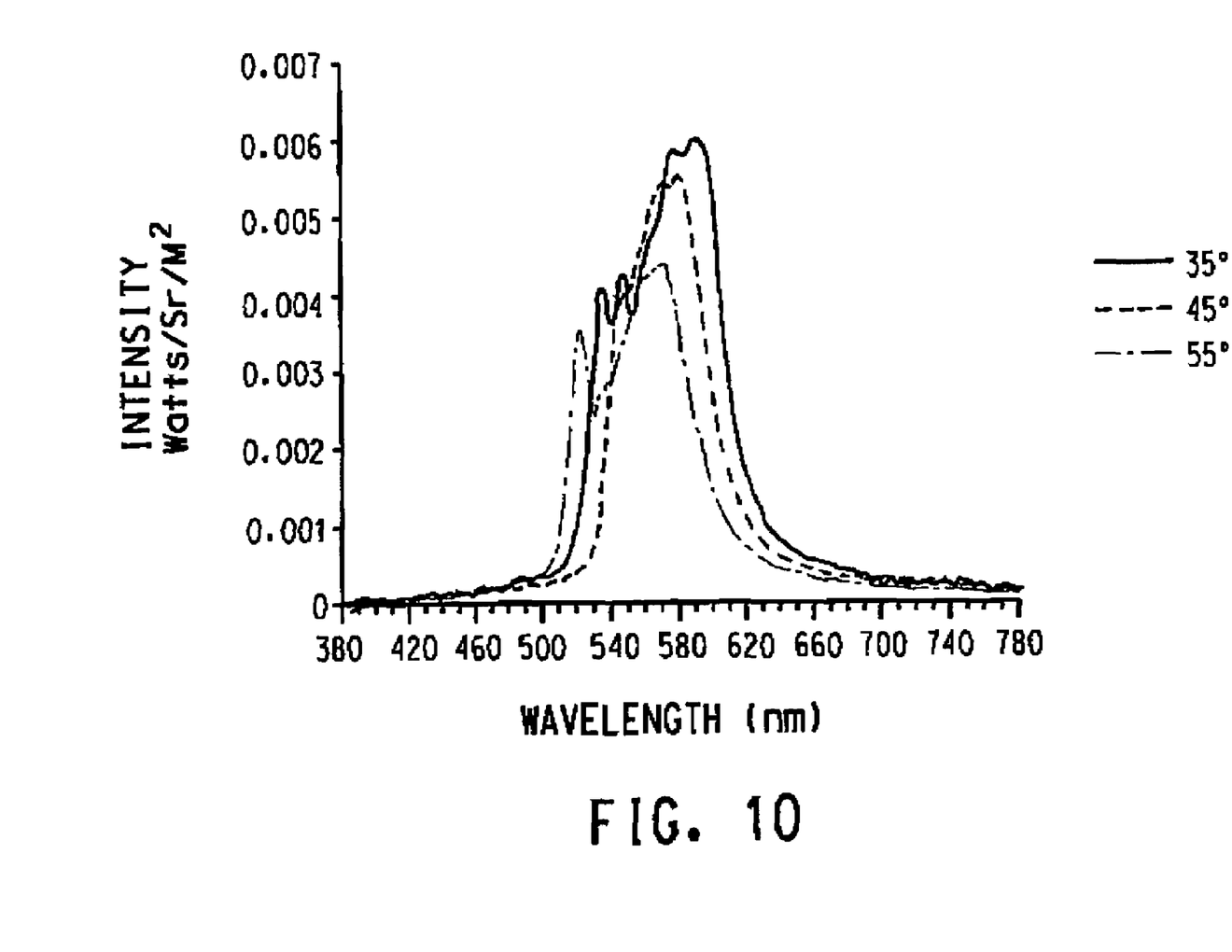
FIG. 10 is a diagram illustrating spectral curves of a reflection hologram.
Figure 11:
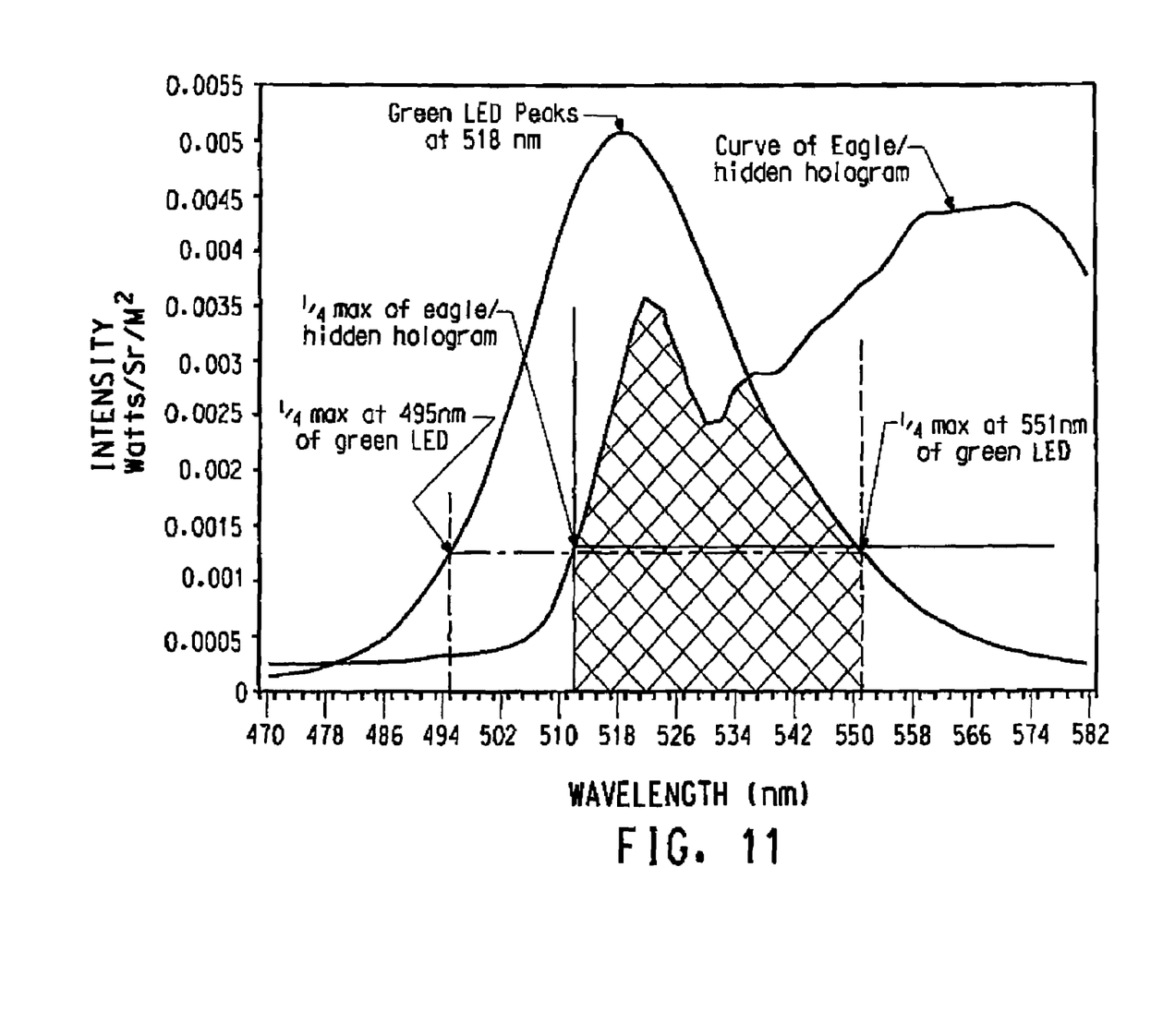
FIG. 11 is a diagram illustrating source curves overlapped with hologram curves.

The light source's spectrum FWQM should at least partially overlap the spectral curve FWQM of the final tuned hologram at some angle in order to work effectively. See Table 3 and the graph of FIG. 10 showing the spectral curves of the hologram illuminated with white light at 3 different angles. See Table 4 and FIG. 11 to see examples of source curves fitting under the hologram curve.

TABLE 3

| Sample | FWQM (nm) | Peak wavelength (nm) | Wavelength range (nm) |
|---|---|---|---|
| Hologram* 35°** at 0° out*** | 88 | 590 | 534-622 |
| Hologram* 45°** at 0° out*** | 92 | 580 | 522-614 |
| Hologram* 55°** at 0° out*** | 96 | 572 | 512-608 |

*Eagle and deep image hologram
**Illumination angle
***observation angle at normal

TABLE 4

Combined Light Source and Hologram Data

| Sample | FWQM (nm) | Peak wavelength (nm) | Wavelength range (nm) |
|---|---|---|---|
| Eagle Hologram 35° at 0° out | 88 | 590 | 534-622 |
| Eagle Hologram 45° at 0° out | 92 | 580 | 522-614 |
| Eagle Hologram 55° at 0° out | 96 | 572 | 512-608 |
| Green | 58 | 518 | 492-550 |
| Green#2 | 56 | 506 | 480-536 |
| Green Laser | 4 | 532 | 530-534 |
| Red Laser | 8 | 652 | 548-556 |
| Green Filter | 14 | 532 | 522-536 |

Example 3

Prophetic

This example illustrates a method of making an embossed deep image hologram.

A first transmission hologram (H1) will be made in any recording material specified for holography. The films would include photopolymer, silver halide, photoresist, dichromated gelatin (DCG), thermal, photochromics, electrochromics, etc. The models will be constructed in the same manner as detailed in Example 2, the volume reflection hologram technique. The exposure times, exposure energies, laser, wavelength, optical geometry, and post exposure processing would be chosen according to needs of the recording material which is all within the expertise of those skilled in the art. The recording apparatus will also be very similar to that specified in Example 2 for the reflection method. For certain optical designs where resist or other surface relief producing recording material and/or process is used, the exposure process could stop here and this H1 would go directly to plate making. See step 1 of FIG. 5 for basic H1 geometry.

The processed H1 from step 1 will next be illuminated in the reverse conjugate direction producing a real image of the original object. A glass plate coated with photoresist or other surface relief producing recording material and/or process will be placed in the vicinity of the real image. The distance between the resist plate and the real projected as well as the text size and/or image detail determines the visibility of the deep hidden image under various lighting conditions. The resist plate is then processed with standard resist processing techniques producing a surface relief pattern that contains the holographic information. In some cases, plastic masters are replicated directly from the resist master. In other cases, the resist or plastic master is converted to a metal (usually nickel) embossing master by electroplating. The embossing master (shim) is then attached to the drum of an embossing machine. The surface relief of the shim is then pressed with heat into a plastic web or sheet on the embossing machine. The plastic may have a softer receiving layer coated onto it. It may also be coated with a UV curing ink that can be hardened after pressing. The plastic may also be precoated on its receiving layer with a reflective metal or it may be coated after pressing. The plastic web will produce deep image holograms and behave in a similar way to the volume reflection deep image hologram (of Example 2) when illuminated with a special light (e.g., approximate point source light).

Example 4

Prophetic

The deep image hologram will work without a surface holographic image (603). The hologram is made in exactly the same way as the deep image hologram in Example 2. However, the original model for the H1 stage would only contain the part of the model that is deep and intended only to be viewed with a special light source in its final form. Also it is now possible to eliminate the second stage hologram by positioning the deep element at the exact desired depth and a slight adjustment of the model for change in illumination angle.

Example 5

Prophetic

Figure 12:
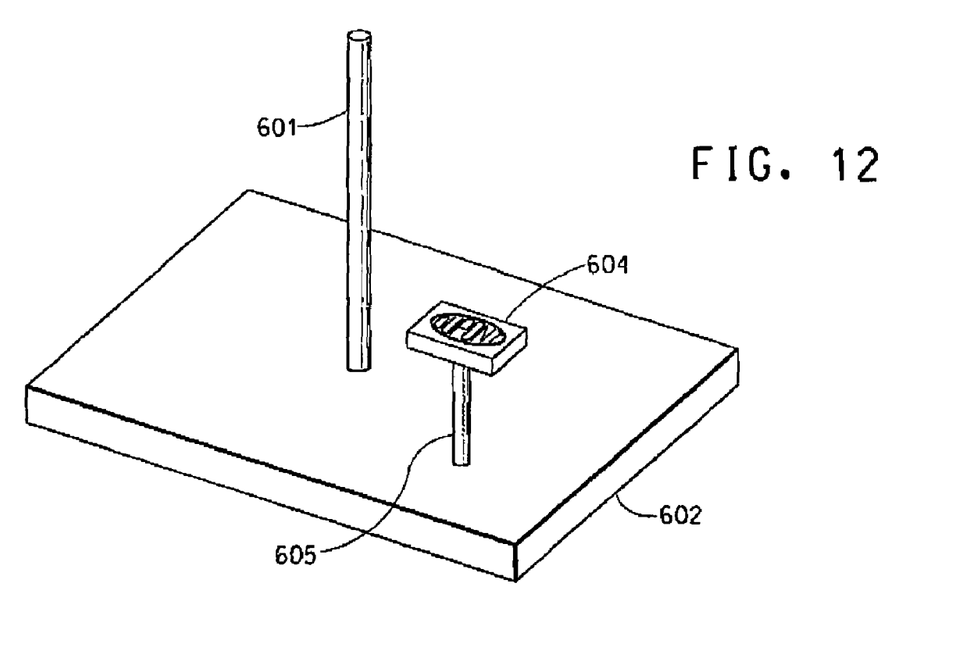
FIG. 12 is a diagram illustrating a physical model.

The deep image hologram will work without a surface holographic image (603). A hologram is made in exactly the same way as the hidden image hologram in Example 2. However, the original model for the H1 stage would only contain the part of the model that is deep and intended only to be viewed with a special light source in its final form. See FIG. 12. Also, it is now possible to eliminate the second stage hologram by positioning the deep element at the exact desired depth and a slight adjustment of the model for change in illumination angle.

Graphics or printing can be printed either on the hologram surface or on an over-laminate, for example, typing, ink-jet printing, or screen-printing. The type will be easily seen under normal conditions, but a special light source will be needed to view the deep or projected hidden image.

Another variation would be to separately construct a separate hologram or holograms either with deep/projected hidden images or surface image elements. Also, combinations could be created. The separately constructed holograms could also be over-laminated to the original hologram. The result would be very similar to the original hidden image with an easily seen surface image element concept.

A commonly used adhesive such as Lintec 1 mil top coat, CCG 2 mil Scratch resistant, or Polatechno ad-20 can be used. These adhesives will all affect the photopolymer holograms when placed in direct contact with the recording material. However, for some DuPont® products such as "Value" the alterations are within tolerable ranges. These variations can be contoured to some degree to the user's desires.

What is claimed is:

1. A method for viewing a three-dimensional image comprising the steps of:
    a) providing a surface image from a surface hologram wherein the surface image is visible in diffuse room light;
    b) providing a deep image from a deep hologram, the deep hologram comprising a surface and a spectral bandwidth, wherein the deep image is a distance from the surface of the deep hologram such that the deep image appears unrecognizable to the human eye under diffuse light; and
    c) illuminating the deep hologram with at least partially collimated, incoherent light from a light source having a spectral bandwidth that overlaps the spectral bandwidth of the deep image hologram so as to make the deep image recognizable to the human eye.

2. The method of claim 1 wherein the deep hologram is formed by a volume reflection method.

3. A three dimensional image comprising a surface image visible in diffuse room light from a surface hologram and a deep image from a deep hologram, wherein the deep image is located a distance from the surface of the deep hologram and appears unrecognizable to the human eye under diffuse light but is visible to the human eye when the deep hologram is illuminated with at least partially collimated, incoherent light from a light source having a spectral bandwidth that overlaps the spectral bandwidth of the deep hologram.

4. The three dimensional image of claim 3 wherein the deep image is located at a distance of at least ⅛ inch from the surface of the deep hologram.

5. The three dimensional image of claim 3 wherein at least one angle θ with respect to a normal line to the surface of the deep hologram is in the range from about +55 degrees to about −55 degrees including all degrees contained therein.

6. A method for establishing the authenticity of an article comprising the steps of:
    (a) providing the three dimensional image of claim 3 on an article; and
    (b) authenticating the article upon illumination of the three dimensional image with at least a partially collimated, incoherent light from a light source having a spectral bandwidth that overlaps the spectral bandwidth of the deep hologram and visualizing the deep image.

7. A device comprising a deep hologram comprising a surface and a spectral bandwidth and a surface hologram producing a three dimensional image comprising a surface image visible in diffuse room light from the surface hologram and a deep image from the deep hologram, wherein the deep image is located a distance from the surface of the deep hologram such that the deep image appears unrecognizable to the human eye under diffuse light but is visible to the human eye when the deep hologram is illuminated with at least partially collimated, incoherent light from a light source having a spectral bandwidth that overlaps the spectral bandwidth of the deep hologram.

8. A method for establishing the authenticity of an article comprising the steps of:
    (a) providing a device of claim 7 on an article; and
    (b) authenticating the article upon illumination of the three dimensional image with at least a partially collimated, incoherent light from a light source having a spectral bandwidth that overlaps the spectral bandwidth of the deep hologram and visualizing the deep image.

* * * * *